Figure 6:
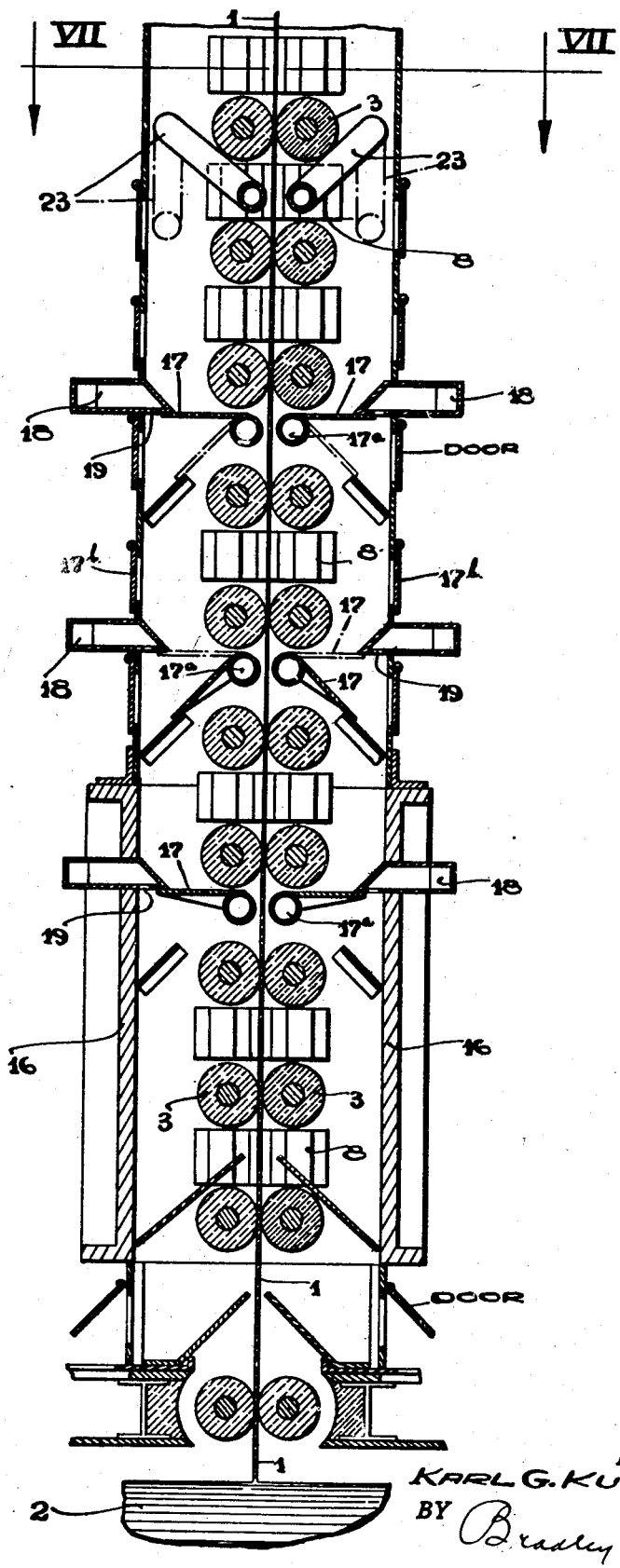

Jan. 22, 1935.  K. G. KUTCHKA  1,988,560
APPARATUS FOR MAKING SHEET GLASS
Filed Aug. 5, 1933  3 Sheets-Sheet 1
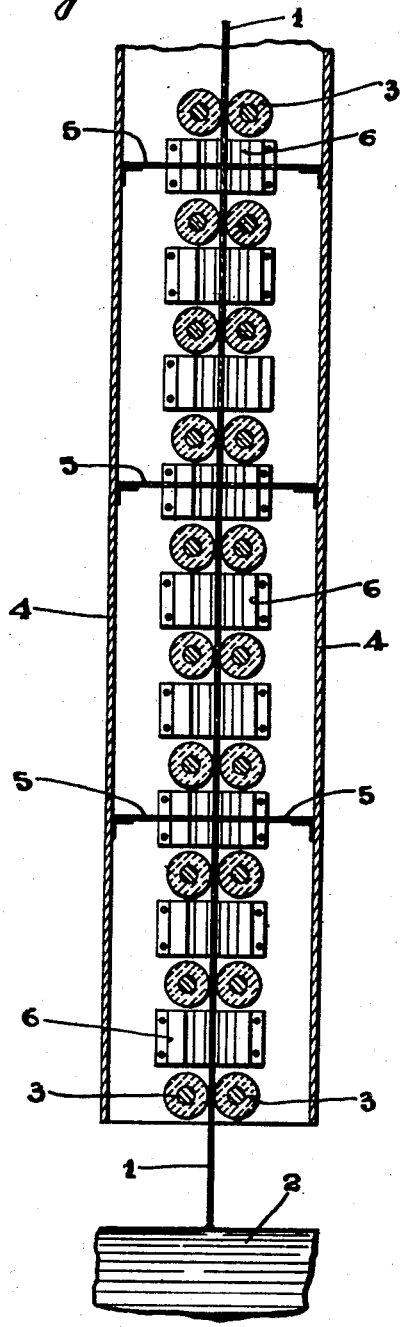
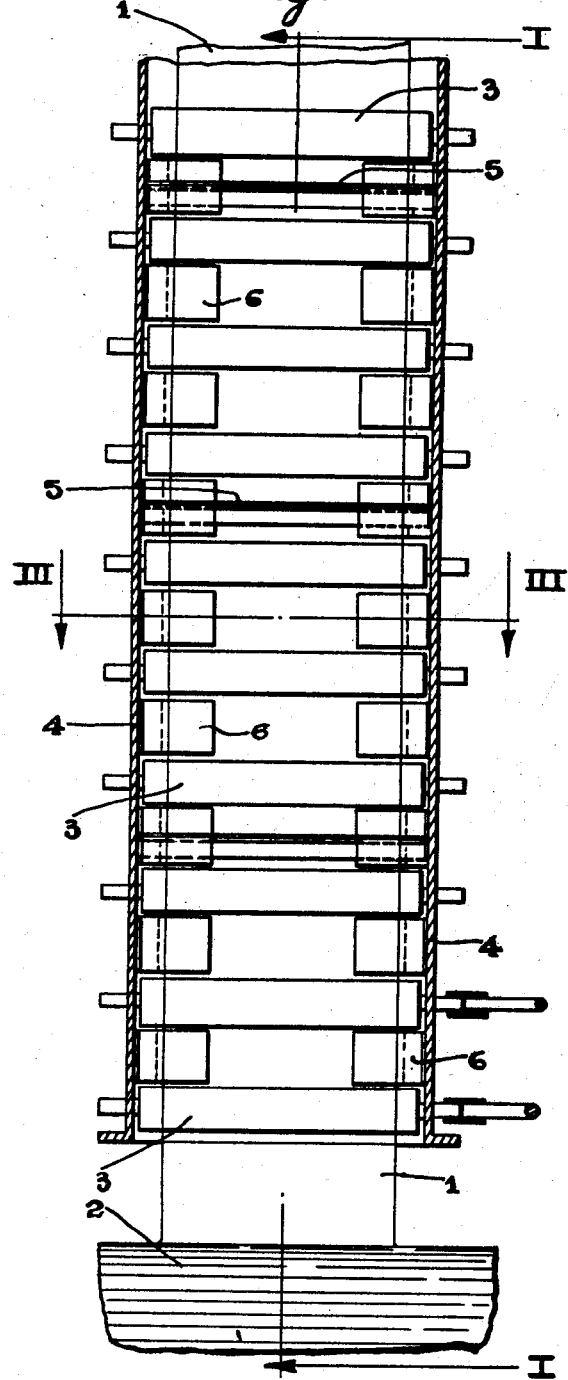
INVENTOR
KARL G. KUTCHKA
BY
Bradley & Bee
ATTORNEYS.

Jan. 22, 1935.   K. G. KUTCHKA   1,988,560
APPARATUS FOR MAKING SHEET GLASS
Filed Aug. 5, 1933   3 Sheets-Sheet 2
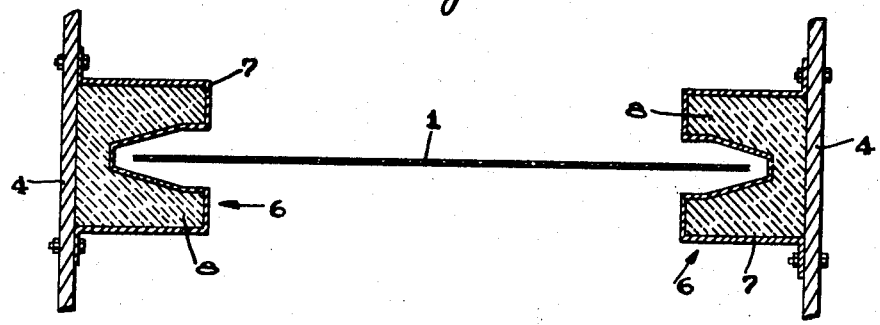
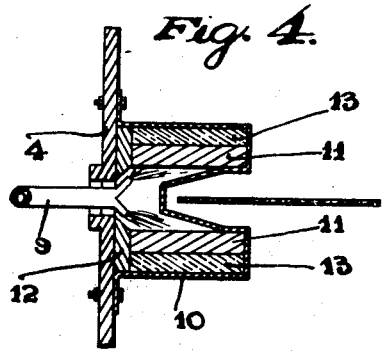
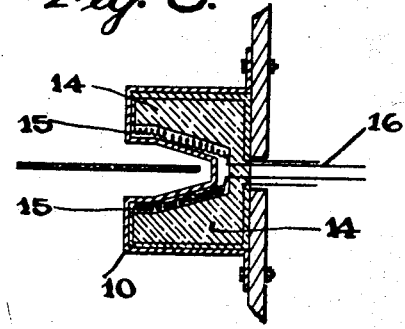
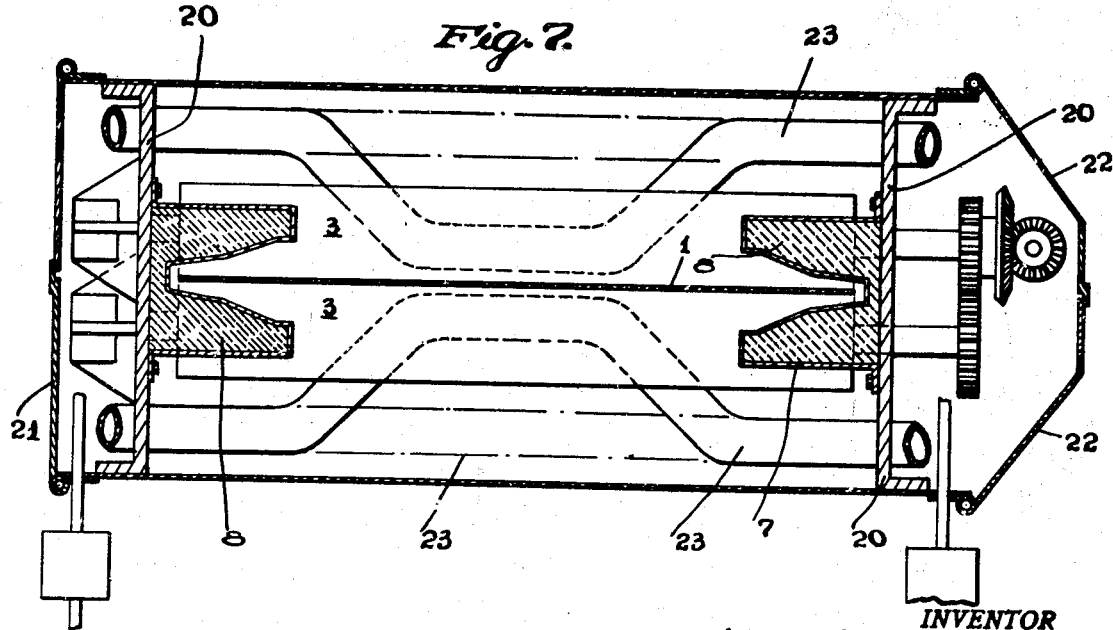
INVENTOR
KARL G. KUTCHKA.
BY Bradley & Bee
ATTORNEYS.

Patented Jan. 22, 1935

1,988,560

UNITED STATES PATENT OFFICE 1,988,560

APPARATUS FOR MAKING SHEET GLASS

Karl G. Kutchka, Wilkinsburg, Pa., assignor to Pittsburgh Plate Glass Company, a corporation of Pennsylvania Application August 5, 1933, Serial No. 683,826

7 Claims. (Cl. 49—17)

The invention relates to apparatus for making sheet glass and more especially to the leer through which the glass is drawn. The invention has for its principal objects the provision of improved means for maintaining the glass sheet at uniform temperature particularly through the critical annealing range. Normally, the edges of the glass cool more rapidly than the central portion imposing strains upon the sheet and making it difficult to cut at the edges and the improvement is designed to overcome this difficulty. Certain embodiments of the invention are illustrated in the accompanying drawings, wherein:

Figure 1 is a vertical section on the line I—I of Fig. 2. Fig. 2 is a vertical section taken at right angles to that of Fig. 1. Fig. 3 is a transverse section on the line III—III of Fig. 2. Figs. 4 and 5 are partial sections through modifications. And Figs. 6 and 7 illustrate a further modification, Fig. 6 being a vertical section, and Fig. 7 a horizontal section on the line VII—VII of Fig. 6.

Referring to the drawings, 1 is a glass sheet which is drawn continuously from the molten bath 2 by means of the pairs of rolls 3, 3, 3, 3, etc. in the casing 4, such rolls being driven by suitable mechanism well-known in the art and not shown. These rolls are preferably of asbestos composition and apply the traction necessary to draw the glass continuously through the casing 4, such glass being severed into sheets above the upper end of the casing. The casing is preferably divided into sections by the baffles 5, 5, 5, etc. placed at suitable intervals along the length of the casing to restrict the circulation of heated air upward therethrough. Interspersed between the pairs of rolls at the edges thereof are the insulating members 6, 6, 6, etc. shown in cross section in Fig. 3. These members consist of sheet metal casings 7 of heat resisting composition secured to the leer casing and filled with insulating material 8, such as asbestos. These casings are provided with V-shaped recesses fitting around the edges of the glass sheet, but spaced away therefrom, as indicated in Fig. 3. These members serve to restrict the radiation of heat from the edges of the sheet so that such edges are maintained at a higher temperature than would otherwise be the case, the net result being that the glass sheet is maintained at a substantially uniform temperature from edge to edge. As a result, hard edges are avoided and strain is eliminated from the sheet. The sheet is thus better annealed and is more easily cut adjacent the edge portions with less breakage.

Fig. 4 illustrated a modification in which the casing member is heated upon the exterior of the V-shaped portion by means of a suitable gas burner 9 extending through the wall of the leer. The member in this instance is made up of the sheet metal casing 10, the refractory bricks 11 and 12, and the insulating material 13.

Fig. 5 illustrates still another modification in which the metal casing 10, which is filled with insulating material 14 as in the Fig. 1 construction, is heated by means of the resistance members 15 lying in the insulation and supplied with current through the leads 16. In all instances, the recesses in the insulating members which surround the edges of the sheet are approximately V-shaped in cross section, as indicated in Figs. 3, 4, and 5, although the exact shape of the recess is immaterial, and it will be understood that the term "V-shaped" is intended to define any form of recess which extends around the edge of the sheet and performs the function of the recess shown.

In the modification of Figs. 6 and 7, the casing 16 is provided with angularly disposed baffles 17, 17, etc., which serve to separate the casing into sections and to catch any broken glass which may fall downward through the casing. These baffles are supported on pipes 17a and, under normal operating conditions, will occupy a horizontal position. When broken glass is collected upon these baffles, they may be swung to inclined position and the broken glass removed through suitable doors 17b. The casing is also provided at intervals with outlet flues 18, 18, etc. having openings at 19 so that a portion of the heated gases may be withdrawn from the various sections and thus reduce the temperature in such sections. These outlet flues are suitably connected to the stack, which is not shown. As indicated in Fig. 7, the edges of the sheet are insulated by heat retaining members 8 similar to those shown in Fig. 3, but in this instance, the walls 20 of the casing, which support these members 8, lie inward of the walls 21 and 22 so that the heat conducted away by the walls 20 is less than if the outer walls 21 and 22 were not employed. In order to facilitate the cooling of the middle portion of the sheet in the leer at the level of the section VII—VII, the water pipes 23, 23 may be employed, means being provided to circulate the water therethrough and thus secure the necessary cooling action. These cooling devices may be employed at suitable intervals beginning at the level of the section VII—VII and extending upward throughout the balance of the leer casing. The pipes are mounted for rotation so that the distance of their middle portions from the glass sheet may be adjusted depending upon the degree of cooling required.

What I claim is:

1. Apparatus for drawing a glass sheet vertically from a bath of molten glass and annealing it, comprising a vertical casing provided with a plurality of pairs of driven rolls spaced along the length of the casing, and adapted to frictionally engage the sheet, and means in the casing for preventing too rapid cooling of the edges of the sheet, comprising V-shaped insulating members interspersed between the pairs of rolls at each edge of the sheet extending from a point outward of said edge to a point well inward thereof and enclosing such edge on three sides.

2. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the edges of the sheet, comprising V-shaped members of heat insulating material interspersed between the pairs of rolls at each edge of the sheet extending from a point outward of said edge to a point well inward thereof and enclosing such edge on three sides.

3. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the edges of the sheet, comprising V-shaped heat retaining members comprising casings of metal filled with insulating material interspersed between the pairs of rolls at each edge of the sheet and enclosing such edge on three sides.

4. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the edges of the sheet, comprising metal casing members having V-shaped recesses therein interspersed between the pairs of rolls on each side of the casing and partially surrounding the edges of the sheet and insulating material in such casing members.

5. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the sheet, comprising V-shaped casing members interspersed between the pairs of rolls at each edge of the sheet each extending from a point outward of the edge to a point well inward thereof and enclosing such edge on three sides, and heating means for said members.

6. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the edges of the sheet, comprising V-shaped metal casings with insulation therein interspersed between the pairs of rolls at each edge of the sheet and partially enclosing such edge, and means for heating the members.

7. Apparatus for drawing a glass sheet vertically from a bath of molten glass and annealing it, comprising a vertical casing provided with a plurality of pairs of driven rolls spaced along the length of the casing and adapted to frictionally engage the sheet, and means in the casing for preventing too rapid cooling of the edges of the sheet, comprising casing members having V-shaped recesses therein interspersed between the pairs of rolls on each side of the casing each extending from a point outward of the edge to a point well inward thereof and partially surrounding the edges of the sheet and gas burners for applying heat to the interiors of the casings.

K. G. KUTCHKA.